Patented Nov. 16, 1926.

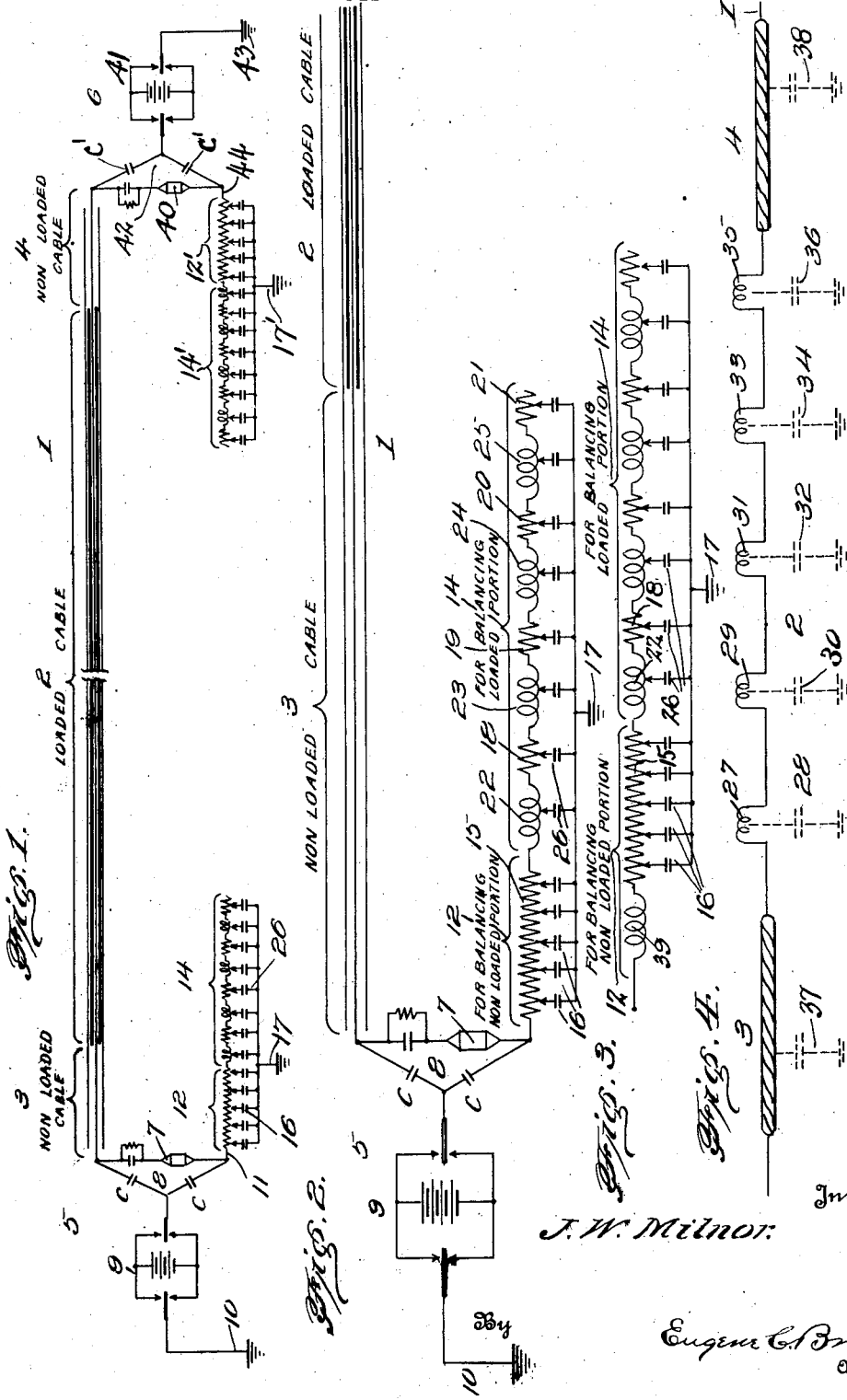

1,607,473

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

DUPLEXING LOADED SUBMARINE CABLE.

Application filed January 22, 1925. Serial No. 3,976.

My invention relates broadly to electric signaling and more particularly to a system for electrically balancing long extended cables for duplex signaling.

One of the objects of my invention is to provide a construction of cable having a loaded portion at its center and non-loaded portions on opposite ends thereof for increasing the speed of signaling over the cable.

Another object of my invention is to provide a method for operating a submarine cable duplex, where artificial balancing means are provided at each end of the cable, compensating the electrical characteristics of the cable.

Still another object of my invention is to provide an arrangement of artificial balancing line in each end of the cable which possesses electrical constants similar to those of the cable and distributed in a manner similar to the distribution of the cable.

A further object of my invention is to provide a construction of artificial balancing line for connection at each end of a cable system where separate portions of the artificial line operate to accurately balance different portions of the cable, the character of the artificial line for balancing one portion of the cable system differing electrically from the character of another portion of the artificial line utilized for balancing another portion of the cable system.

My invention comtemplates the accurate balancing of an ocean cable, one portion of which is loaded and other portions of which are not loaded. The loaded portion of the cable is located at the center of the system while the non-loaded portions are situated on opposite ends of the loaded portion.

This arrangement is a considerable improvement over an unloaded cable in that the cable system constructed in accordance with my invention, can be operated at higher speed. The system as herein described is also an improvement over a cable which is loaded throughout its entire length because it can be duplexed more efficiently. The presence of the non-loaded portion of cable at each end greatly facilitates obtaining an accurate artificial line balance. The artificial line for balancing the loaded portion of the cable differs in electrical characteristics from the electrical characteristics, of that portion of the artificial line required for balancing the non-loaded portions of the cable system. For efficient operation of the cable it is necessary that the similarity between the cable and the artificial line be very accurate. In practice the degree of efficiency required varies from one part in 3,000 to one part in 10,000. This degree of accuracy is especially required in the portion of the artificial line which balances the nearest part or head of the cable. A lesser degree of accuracy is necessary for portions of the artificial line away from the head of the line. For example, at a distance of approximately one hundred miles out from the head, the necessary degree of accuracy in balancing by the artificial line may be reduced to approximately one ($\frac{1}{4}$) fourth of the value necessary at the head. Similarly at a distance of approximately two hundred miles out from the head the required accuracy in the characteristics of the artificial line may be reduced to approximately one ($\frac{1}{16}$) sixteenth. The accurate balancing of a loaded cable is far more difficult than the balancing of a non-loaded cable for the following reasons:

1. The artificial line for balancing non-loaded cables is ordinarily made up of resistance units and condensers arranged in a network so as to simulate the cable; sometimes a small amount of inductance is added. It is not essential to have the value of the inductance accurately adjusted, because the value of the inductance is small. The artificial line for balancing a loaded cable in addition to accurately balancing the resistance and capacity of the cable, must also accurately balance the inductance of the cable. It must therefore possess adjustable resistance, capacity and inductance, all three values of which must be correct within the required degree of accuracy.

2. The inductance of a loaded cable is normally obtained by means of some magnetic material. Such material ordinarily has permeability which is not constant, but instead is variable to a greater or less degree, depending upon the amount of current through the cable, and depending further upon the value of the current which was passed through the cable immediately preceding the time period under consideration.

By decreasing the voltage and current used in the cable the variation of the permeability of the loading material, and, hence, of the inductance of the cable, may be reduced, but a large reduction of such variations in this manner is not practical because with the smaller signaling currents, the cable becomes more susceptible to extraneous interference and to the effects known as "earth potentials" and "wandering zero."

My present invention provides a system for balancing a loaded cable, having a main cable portion and non-loaded portion of cable on either end of the main cable portion. By this arrangement an artificial line may be connected at either end of the cable which substantially reduces the undesirable effects listed above. The arrangement of the artificial line will be more fully understood from the specification hereinafter following by reference to the accompanying drawing, in which:

Figure 1 represents an ocean cable system with artificial lines arranged at either end of the system for compensating for the electrical characteristics of the cable; Fig. 2 is an enlarged diagram showing one end of the cable system and the electrical arrangement of the artificial line; Fig. 3 shows a modified diagrammatic arrangement of the artificial line; and Fig. 4 illustrates the arrangement of the cable system where a non-loaded portion is provided on each end of the cable opposite the intermediate loaded portion.

The artificial line employed in the present system comprises two distinct portions electrically connected in series, each of the portions being designed with such electrical characteristics as to efficiently balance the non-loaded portion of the cable and the loaded portion of the cable. The portion of the artificial line which balances the head end or non-loaded portion of the cable is electrically connected immediately adjacent the transmitting and receiving apparatus at the terminal station. This portion of the artificial line may consist of resistance and capacity only or possibly a very small amount of inductance may be included in the artificial line sufficient to balance the non-loaded portion of the cable. Beyond this section of the artificial line there would be a portion of artificial line with resistance, capacity and inductance so arranged as to balance the loaded portion of the cable, the loaded portion of the cable being physically away from the head of the line. The degree of accuracy required in the corresponding portion of the artificial line is far lower than if the non-loaded portion of the cable was not included in this circuit.

Referring more particularly to the drawings, the ocean cable is represented by reference character 1, including a loaded portion 2 with a non-loaded portion 3 and 4 on either end thereof. The terminal stations at either end of the extended cable system are designated by reference characters 5 and 6. The receiving apparatus at station 5 is designated generally by reference character 7 in conventional relation to the arms 8 of a Wheatstone bridge circuit, provided with condensers C for duplex working of the cable system. The transmitting apparatus has been designated generally by reference character 9, having means for alternately connecting the positive or negative side of the local source to the line in accordance with the signal impulses transmitted, the circuit being grounded as represented at 10. The artificial line is connected to the end of the cable system as indicated at 11. The line includes two portions 12 and 14, the portion 12 being designed to accurately balance the non-loaded cable portion 3 while the portion 14 is designed to accurately balance the loaded portion 2 of the cable. The portion 12 of the artificial line may consist of sections of resistance 15, to which may be adjustably connected the condensers 16 providing an electrical circuit through ground connection 17 by which substantially complete balancing of the electrical characteristics of the non-loaded portion of the cable 3 is secured. The portion 14 of the artificial line which balances the loaded portion of the cable may consist of sections of resistance 18, 19, 20 and 21 with alternate sections of inductance 22, 23, 24, and 25 to which may be adjustably connected condensers 26, and from thence connected to ground providing a circuit for balancing the electrical characteristics of the loaded portion of the cable 2. The values of the inductance, resistance and capacity in the artificial line portion 14 may be adjustable in order to accurately simulate conditions existing in the loaded cable. Figure 4 represents diagrammatically the theoretical inductance and capacity values, in the loaded portion of the cable, 27, 28, 29, 30, 31, 32, 33, 34, 35, and 36 which must be balanced by the artificial line portion 14. The non-loaded portions of the cable represented at 3 and 4 have inherent capacities 37 and 38 with respect to the earth, which capacities are balanced by the portion 12 of the artificial line. The portion 12 of the artificial line for accurately balancing the non-loaded portion of the cable 3 may include a small amount of inductance 39 as represented in Fig. 3, this inductance being connected in series with the resistance 15, the circuit being thus balanced by inductance 39, resistance 15 and capacities 16 with the circuit completed through ground 17. The non-loaded portion 3 of the cable normally has a very small value of inductance and for this reason the amount of compensating inductance 39 in the artificial line portion 12 is relatively small or may be disposed with altogether as represented in Figs. 1 and 2.

It will be understood that the several inductances, resistances and capacities in the artificial line are each adjustable to accurately place the circuit in a condition where it simulates the characteristics of the cable system.

At station 6 at the opposite end of the cable 1 there is provided a receiving apparatus 40 and transmitting system 41 connected in the Wheatstone bridge circuit 42, having condensers C' C' in the arms thereof, the circuit being completed to ground 43. The artificial line for the terminal station 6 is connected as represented at 44 and comprises, as in the case of the artificial line at the terminal station 5, a portion 12' for balancing the non-loaded portion 4 of the cable and portion 14' for balancing the loaded portion 2 of the cable, the balancing circuit being completed through ground connection 17'.

It will be understood that an accurate balancing of the cable may be secured by the arrangement of artificial lines at each end of the cable as herein described. While it is true that the substitution of non-loaded cable for loaded cable on each end of the cable circuit increases the signal attenuation of the cable circuit, which in itself is undesirable, the highly accurate balance obtained with the arrangement of cable and artificial line herein described more than compensates for the increased attenuation. As an example, it was estimated in one case that a degree of accuracy of one part in 3200 would be necessary to satisfactorily balance for duplexing a certain loaded cable 2400 miles in length. By inserting a length of 300 miles of non-loaded cable in place of that length of loaded cable, at each end of the circuit, it would be possible to reduce the degree of accuracy in the portion of the artificial line corresponding to the loaded cable to one part in 400.

While I have described my invention in certain preferred embodiments it will be understood that modifications may be made and that no limitations upon the invention are intended other than those imposed by the scope of the appended claims.

What I claim and desire to secure by Letters Patent of the United States is as follows:

1. The method of balancing the constants of an extended cable, having loaded and non-loaded portions, which comprises separating an artificial line into a plurality of portions and adjusting one of said portions to balance the non-loaded portion of said cable and adjusting another portion of said artificial line for balancing the loaded portion of said cable.

2. The method of balancing the constants of an extended cable, having loaded and non-loaded portions, which comprises separating an artificial line into a plurality of portions, connecting said portions of said artificial line in series whereby one of the portions of said artificial line balances the loaded portion of said cable and another portion of said artificial line balances the non-loaded portion of said cable.

3. A cable system comprising in combination, an extended electric cable having a loaded portion and a non-loaded portion on each end thereof, duplex transmitting and receiving apparatus connected at each end of said cable system and an artificial line connected at each end of said cable system, each of said artificial lines comprising a pair of portions having differing electrical characteristics, one of said portions operating to balance the non-loaded portion of said cable system and the other of said portions operating to balance the loaded portion of said cable system.

4. An electric signaling system comprising in combination, a cable having non-loaded portions at opposite ends thereof and an intermediate loaded portion, transmitting and receiving apparatus for duplex operation connected at opposite ends of said cable and an artificial line connected at each end of said cable, each of said artificial lines including a portion for balancing the non-loaded portion of said cable and a separate portion for balancing the loaded portion of said cable, the portions of said artificial lines being electrically connected in series with said portion of said artificial line for balancing the non-loaded portion of said cable connected adjacent the end of said cable.

5. An electric signaling system, comprising in combination a cable, including a loaded portion and a non-loaded portion at each end thereof, duplex signaling apparatus connected to opposite ends of said cable and an artificial line at opposite ends of said cable, and connected with said signaling apparatus, said artificial line consisting of a pair of portions, each having electrical characteristics differing one from the other, the electrical characteristics of one portion of said artificial line simulating the electrical characteristics of the loaded portion of said cable and the other portion of said artificial line having electrical characteristics simulating the electrical characteristics of the non-loaded portion of said cable.

6. An electric signaling system, comprising in combination a cable, said cable having a loaded portion and a non-loaded portion, signaling apparatus connected to each end of said cable and an artificial line connected with each end of said cable, said artificial line having a plurality of portions, one of said portions being arranged to balance the electrical constants of said non-loaded portion of said cable and the other portion of said artificial line being arranged to balance the loaded portion of said cable, said first mentioned portion of said artificial line being connected intermediate the end of said cable and said second mentioned portion of said artificial line.

7. An artificial line, for balancing a cable, having a loaded portion and a non-loaded portion, said artificial line including a pair of separate portions for electrically balancing the loaded portion and the non-loaded portion of said cable, one portion of said artificial line including resistance and capacity, and the other portion of said artificial line including inductance, resistance, and capacity.

8. An artificial line for balancing a cable, having a loaded portion and a non-loaded portion, said artificial line including a pair of separate portions for electrically balancing the loaded portion and the non-loaded portion of said cable, one portion of said artificial line including resistance and capacity and the other portion of said artificial line including capacity and alternately connected inductances and resistances.

9. An artificial line for balancing a cable, having a loaded portion and a non-loaded portion, said artificial line including a pair of separate portions for electrically balancing the loaded portion and the non-loaded portion of said cable, one portion of said artificial line including a resistance and capacity and the other portion of said artificial line including capacity and alternately connected inductances and resistances, said first mentioned portion of said artificial line being connected adjacent the non-loaded portion of said cable and said last mentioned portion of said artificial line being connected in series with said first mentioned portion and remote from the end of said cable.

10. An artificial line for balancing a cable, having a loaded portion and a non-loaded portion, said artificial line including a pair of separate portions for electrically balancing the loaded portion and the non-loaded portion of said cable, one portion of said artificial line including a resistance and capacity, and the other portion of said artificial line including inductance, resistance and capacity, said last named portion of said artificial line being connected in series with said first mentioned portion of said artificial line with said first mentioned portion of said artificial line interposed between the end of said cable and said second mentioned portion of said artificial line.

In testimony whereof I affix my signature.

JOSEPH W. MILNOR.